(12) United States Patent
Haochuan

(10) Patent No.: US 7,730,748 B2
(45) Date of Patent: Jun. 8, 2010

(54) METHOD OF MAKING A POST-PATENT COLLIMATOR ASSEMBLY

(75) Inventor: Jiang Haochuan, Brookfield, WI (US)

(73) Assignee: General Electric Company, Schnectady, NY (US)

( * ) Notice: Subject to any disclaimer, the term of this patent is extended or adjusted under 35 U.S.C. 154(b) by 945 days.

(21) Appl. No.: 10/605,575

(22) Filed: Oct. 9, 2003

(65) Prior Publication Data

US 2005/0078798 A1    Apr. 14, 2005

(51) Int. Cl.
*C03B 37/012* (2006.01)
(52) U.S. Cl. .............................. 65/393; 65/409; 65/411
(58) Field of Classification Search .................. 65/393, 65/409, 411

See application file for complete search history.

(56) References Cited

U.S. PATENT DOCUMENTS 3,713,816 A * 1/1973 MacCragh et al. ............ 419/19
3,859,071 A * 1/1975 Beasley et al. ................ 65/508
3,917,490 A * 11/1975 Brown et al. .............. 429/231.9
4,849,000 A * 7/1989 Patrick ......................... 65/393
4,853,020 A * 8/1989 Sink ............................. 65/393
5,376,329 A * 12/1994 Morgan et al. ................ 419/39
5,879,425 A * 3/1999 Jensen .......................... 65/393

OTHER PUBLICATIONS

Grant and Hackh's Chemical Dictionary, 5th edition, 1991, p. 638.*

* cited by examiner

*Primary Examiner*—John Hoffmann
(74) *Attorney, Agent, or Firm*—Peter Vogel

(57) ABSTRACT

A method of manufacturing a collimator assembly is provided. The method includes placing a first core element within a first center collimator path of a first collimator tube to create a first base-tube couple. A couple cross-section of the first base-tube couple is reduced such that the first base-tube couple becomes a first single-fiber fiber. The first single-fiber fiber is assembled into a collimator group. The first core element is dissolved such that a first hollow fiber is generated.

15 Claims, 2 Drawing Sheets

METHOD OF MAKING A POST-PATENT COLLIMATOR ASSEMBLY

BACKGROUND OF INVENTION

The present invention relates generally to a collimator assembly, and, more particularly to a collimator assembly and method of manufacture.

Computed tomography has been utilized for a wide variety of imaging applications. One such category of applications is comprised of medical imaging. Although it is known that computed tomography may take on a wide variety of configurations within the medical industry, it commonly is based on the transmission of low energy rays through a body structure. These low energy rays are subsequently received and processed to formulate an image, often three-dimensional, of the body structure that can by analyzed by clinicians as a diagnostic aid.

The reception of the low energy rays, such as gamma-rays or x-rays, is often accomplished through the use of a device referred to as a scintillator detector. The scintillator detector is typically comprised of a plurality of structures working in concert to receive and process the incoming energy rays after they have passed through the body structure. A collimator is an element often found in a scintillator detector that is used to limit the direction of photons as they approach the scintillator element. The collimator is commonly used to increase the magnification of a viewed object or control resolution or field of view. Their primary purpose, in a scintillator detector, however, is to control the photons impinging on the scintillator element.

The scintillator element, in turn, is commonly a material with the ability to absorb the photons and convert their energy into visible light. This allows the low energy rays received by the scintillator detector to be converted into useful information. Scintillator elements may come in a wide variety of forms and may be adapted to receive a wide variety of incoming rays. The light produced by the scintillator element is commonly processed by way of a device such as a light sensitive photodiode which converts the light from the scintillator element into an amplified electronic signal. In this fashion, the information from the scintillator detector can be easily transferred, converted, and processed by electronic modules to facilitate viewing and manipulation by clinicians.

Current post-patient collimator assemblies provide crucial functioning for image quality by reducing the scattering of transmitted x-ray photons. Scattered photons can cause noise and reduce resolution causing image artifacts. As imaging applications require increased z-coverage, manufacturing of suitable collimator assemblies becomes more challenging. Traditional methodologies can decrease reliability and cost of manufacture as the burden on collimator performance increases. The additional press for increased resolution requirements further burdens collimator design.

It would, however, be highly desirable to have a method of producing a collimator assembly with improved manufacturing characteristics. Similarly, it would be highly desirable to have a collimator assembly and method of manufacturing that was compatible with the increasing resolution requirements of imaging systems.

SUMMARY OF INVENTION

A method of manufacturing a collimator assembly is provided. The method includes placing a first core element within a first center collimator path of a first collimator tube to create a first base-tube couple. A couple cross-section of the first base-tube couple is reduced such that the first base-tube couple becomes a first single-fiber fiber. The first single-fiber fiber is assembled into a collimator group. The first core element is dissolved such that a first hollow fiber is generated. Other features of the present invention will become apparent when viewed in light of the detailed description of the preferred embodiment when taken in conjunction with the attached drawings and appended claims.

DETAILED DESCRIPTION

Figure 1:
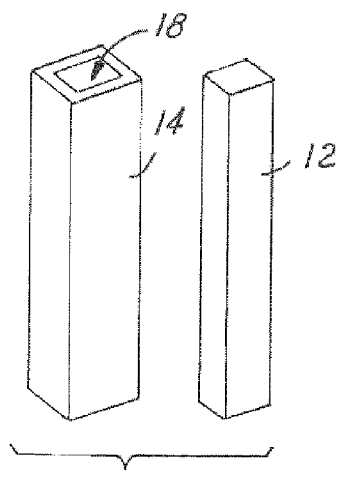
FIG. 1 is an illustration a core element and collimator tube for use in the present invention.

Referring now to FIGS. 1-10, which are a method of manufacturing a collimator assembly 10 in accordance with the present invention. FIG. 1 illustrates the use of a core element 12 and a collimator tube 14. Although the core element 12 and collimator tube 14 are illustrated in a square configuration, it should be understood that they be manufactured in a variety of configurations including, but not limited to rectangular and circular. Similarly a variety of materials can be utilized to generate the core element 12 and collimator tube 14. In one embodiment, however, it is contemplated that the collimator tube 14 may be comprised of a high-z glass. It is further contemplated that in one embodiment the collimator tube 14 may be comprised of any of the following ingredients: lead oxide (PbO), bismuth oxide ($Bi_2O_3$), tantalum oxide ($Ta_2O_5$), tungsten oxide ($WO_3$), thorium oxide ($ThO_2$), hafnium oxide ($HfO_2$), silicon oxide ($SiO_2$), potassium oxide ($K_2O$), boron oxide ($B_2O_3$), aluminum oxide ($Al_2O_3$), gallium oxide ($Ga_2O_3$), germanium oxide ($GeO_2$), cerium oxide ($CeO_2$), and antimony oxide ($Sb_2O_3$). In still another embodiment, metal tungsten powder can be added to the glass and sintered in with the glass powder to increase the density and x-ray stopping power. Although a list of ingredients has been provided, a variety of materials and ingredients would be obvious to one skilled in the art in light of the information provided in this disclosure. The core element 12 is preferably manufactured from a different material than the collimator tube 14. Although the core glass 12 may be manufactured from a variety of materials, one embodiment contemplates the use of a material less durable chemically than the collimator tube 14 such as SiO2—K2O or SiO2—Na2O or other high alkali glass.

Figure 2:
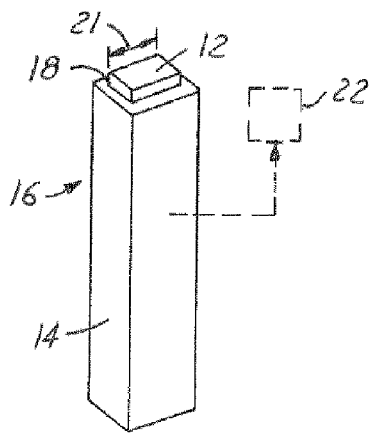
FIG. 2 an assembled view of the core element and collimator tube illustrated in FIG. 1.
Figure 3:
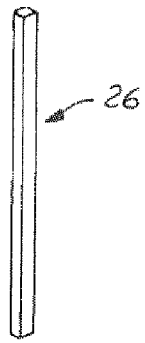
FIG. 3 is an illustration of the assembled core element and collimator tube illustrated in FIG. 2, the element and tube assembly reduced into a single fiber.
Figure 4:
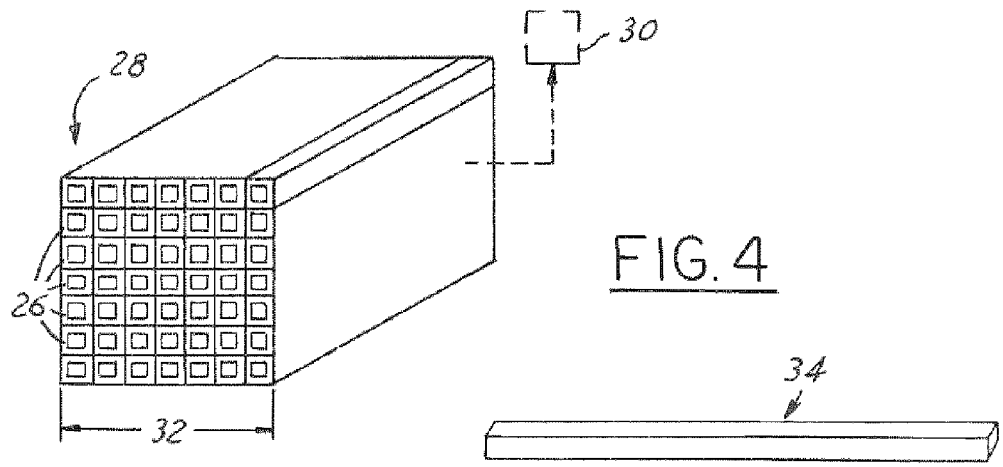
FIG. 4 is an illustration of plurality of single fibers as illustrated in FIG. 3 grouped into a multi-fiber group.
Figure 5:
FIG. 5 is an illustration of the multi-fiber group illustrated in FIG. 4, the multi-fiber group reduced into a multi-fiber fiber.
Figure 6:
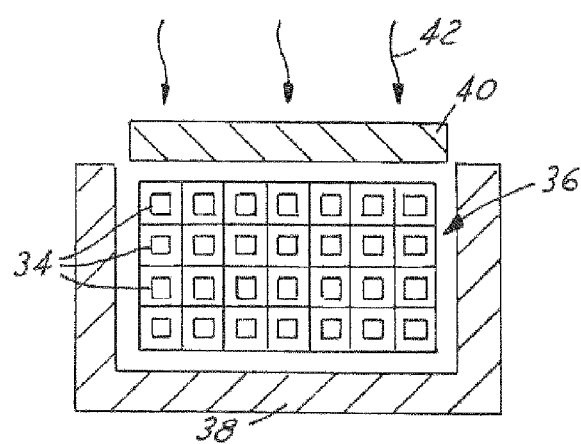
FIG. 6 is an illustration of a plurality of multi-fiber fibers as illustrated in FIG. 5, the plurality of multi-fiber fibers illustrated positioned within a mold for fusing.

The core element 12 and the collimator tube 14 are assembled into a base-tube couple 16 by placing the core element 12 within the center collimator path 18 of the collimator tube 14 (see FIG. 2). The base-tube couple 16 is then subjected to a reducing process 22 such as a fiber drawings process. Fiber drawing processes are known manufacturing techniques wherein material is typically heated within a fiber drawing furnace and then physically drawn out into a fiber. Although a drawing process has been described, the present invention contemplates a wide variety of reducing processes wherein the couple cross-section 24 is reduced to generate a single-fiber fiber 26 (see FIG. 3). The core element 12 and the collimator tube 14 are preferably formed from glass with the same or very close glass transition temperature Tg such that during the fiber drawing process 22 they will deform in a similar fashion. The result of submitting the base-tube couple 16 to the fiber drawings process 22 is that a single-fiber fiber 26 is generated. The single-fiber fiber 26 may be cut to a desired length. A plurality of such single fiber-fibers 26 may be manufactured in a similar fashion. The plurality of single fiber-fibers 26 (additional single-fiber fibers) are then arranged into a multi-fiber bundle 28 (see FIG. 4).

The multi-fiber bundle 28 can then be submitted to a second reducing process 30. The second reducing process reduces the multi-fiber cross-section 32 and generates a multi-fiber fiber 34 (see FIG. 5). Again, although a variety of reducing processes 30 can be utilized, one contemplates a fiber drawings process. It is contemplated that a plurality of such multi-fiber fibers 34 can be generated using the aforementioned methodology. It is contemplated that this plurality of multi-fiber fibers 34 can be arranged into a block of multi-fiber fibers 36 (see FIG. 6). The block 36 can them be placed within a mold 38 and subjected to pressed fusion. Under pressed fusion, a pressing element 40 places the block 36 under pressure while a heat delivery element 42 raises the temperature of the block 36 until the plurality of multi-fiber fibers 36 are permanently fused together into the block 36 form. Although the precise temperature and methodology may be adapted to particular materials for the core elements 12 and collimator tubes 14, one embodiment contemplates using a temperature above the glass transition temperature of both components but less than the melting temperature Tm of either glass.

Figure 7:
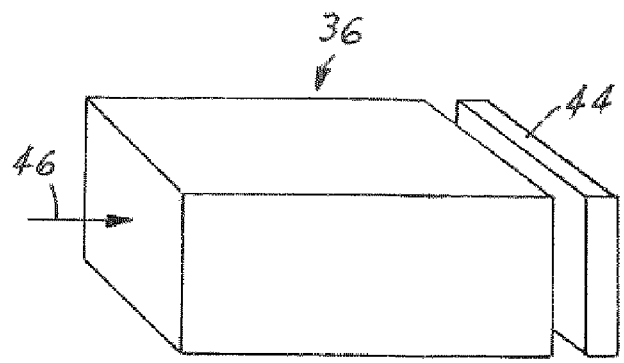
FIG. 7 is an illustration of a block of fused multi-fiber fibers illustrated in FIG. 6, the block illustrated having been cut to a desired collimator depth.
Figure 8:
FIG. 8 is an illustration of the sliced collimator depth portion illustrated in FIG. 7.
Figure 9:
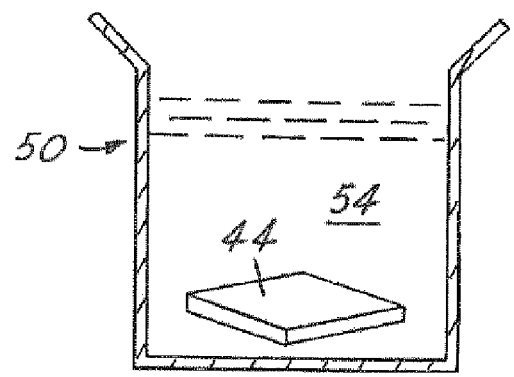
FIG. 9 is an illustration of the sliced collimator depth portion illustrated in FIG. 7, the sliced collimator depth portion illustrated submerged in an acid-bath.
Figure 10:
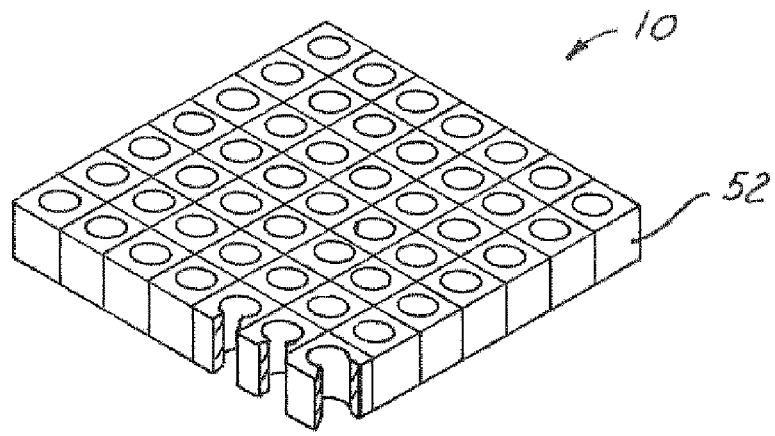
FIG. 10 is an illustration of a collimator assembly resultant from removal from the acid bath illustrated in FIG. 9, the illustrating detailing the dissolved core elements.

After fusion of the block 36, a disc 44 can be cut off of the block 36 across the fiber axis 46 (see FIGS. 7 and 8). The disc 44 is preferably cut to a desired collimator depth 48. The desired collimator depth 48 can be determined by the scattering reduction requirements of the collimator assembly. Although the disc 44 may be cut perpendicular to the fiber axis 46, it should be understood that they need not be. The disc 44 may be cut at an angle to the fiber axis 46 to provide a tilting design of the collimator that is needed for certain computed-tomography detector designs.

The resultant disc 44 is then subjected to a dissolving process 50. Although the term dissolving process 50 (see FIG. 9) is utilized, it should be understood that the term is contemplated to also include melting or similar processes. The significance is that the core element 12 is dissolve/melted from within each of the collimator tubes 14 such that a plurality of hollow fibers 52 are generated (see FIG. 10). These remaining high-z clad glass structures thereby become a collimator. It should be noted that the core element 12 and collimator tube 14 should be comprises of differing physical properties that allow the core element 12 to be dissolved/melted out of the collimator tube 14 without damage to the collimator tube 14. One approach is to utilize a soluble core element 12 in combination with an insoluble collimator tube 14. Other approaches may utilized varying Tm. Finally, although a variety of dissolving processes 50 may be utilized depending on the material makeup of the core element 12 and the collimator tube 14, one embodiment contemplates the use of an acid bath 54.

It should be understood that the geometry of the collimator assembly 10 can be manipulated by changing the clad-core geometry (core element 12 and collimator tube 14) and the fiber drawings process 22. Some of the key parameters include, but are not limited to, composition of the core element 12 and collimator tube 14, the fiber drawing temperature, the fiber drawing speed, the fusion pressure, and the fusion temperature, the acid treatment parameters. These and other parameters can be adjusted and modified such that a collimator assembly 10 with a desired pixel size and wall thickness can be manufactured.

While particular embodiments of the invention have been shown and described, numerous variations and alternative embodiments will occur to those skilled in the art. Accordingly, it is intended that the invention be limited only in terms of the appended claims.

The invention claimed is:

1. A method of manufacturing a collimator assembly comprising:
   sintering a tungsten powder and a glass powder mixture to form a first collimator tube;
   placing a first core element within a first center collimator path of said first collimator tube to create a first base-tube couple;
   reducing a couple cross-section of said first base-tube couple such that said first base-tube couple becomes a first single-fiber fiber;
   assembling said first single-fiber fiber into a collimator group; and
   dissolving said first core element such that a first hollow fiber is generated.

2. A method of manufacturing a collimator assembly as described in claim 1, wherein said reducing a couple cross-section comprises:
   heating said first base-tube couple; and
   drawing said first base-tube couple.

3. A method of manufacturing a collimator assembly as described in claim 1, wherein:
   said first collimator tube comprises a cladding glass tube;
   said first core element comprises a glass core; and
   said first core element comprises a first glass transition temperature, said first collimator tube comprises a second glass transition temperature, said first glass transition temperature and said second glass transition temperature are substantially identical.

4. A method of manufacturing a collimator assembly as described in claim 1, wherein said first collimator tube comprises high-Z glass.

5. A method of manufacturing a collimator assembly as described in claim 1, wherein said first collimator tube comprises material taken from the group consisting of lead oxide, bismuth oxide, tantalum oxide, tungsten oxide, thorium oxide, hafnium oxide, silicon oxide, potassium oxide, boron oxide, aluminum oxide, gallium oxide, germanium oxide, cerium oxide, and antimony oxide.

6. A method of manufacturing a collimator assembly as described in claim 1, further comprising:
producing a plurality of additional single-fiber fibers;
arranging said plurality of additional single-fiber fibers into a first multi-fiber bundle;
reducing said first multi-fiber bundle to generate a multi-fiber fiber; and
assembling said multi-fiber fiber into the collimator assembly.

7. A method of manufacturing a collimator assembly as described in claim 6, further comprising:
producing a plurality of additional multi-fiber fibers;
arranging said plurality of additional multi-fiber fibers into a block; and
fusing said additional multi-fiber fibers.

8. A method of manufacturing a collimator assembly as described in claim 7, further comprising:
slicing said block to a desired collimator depth such that a plurality of collimator assemblies may be produced from said block with varied collimating characteristics.

9. A method of manufacturing a collimator assembly as described in claim 1, wherein said dissolving said first core comprises:
placing said the collimator assembly into a water based acid bath.

10. A method of manufacturing a collimator assembly as described in claim 1, wherein said first collimator tube comprises an insoluble collimator tube; and said first core element comprises a soluble core element.

11. A method of manufacturing a collimator assembly comprising:
producing a plurality of single-fiber fibers, each of said single-fiber fibers produced by:
sintering a high-z powder and a glass powder mixture to form a first collimator tube;
placing a core element within a center collimator path of said collimator tube to create a base-tube couple; and
reducing a couple cross-section of said base-tube couple such that said base-tube couple becomes a single-fiber fiber;
arranging said plurality of single-fiber fibers into a first multi-fiber bundle; and
dissolving said core elements such that a plurality of hollow fibers is generated.

12. A method of manufacturing a collimator assembly as described in claim 11, further comprising:
reducing said first multi-fiber bundle to generate a multi-fiber fiber;
producing a plurality of said multi-fiber fibers;
arranging said plurality of multi-fiber fibers into a block; and
fusing said plurality of multi-fiber fibers.

13. A method of manufacturing a collimator assembly as described in claim 11, wherein said reducing a couple cross-section comprises:
heating said base-tube couple; and
drawing said base-tube couple.

14. A method of manufacturing a collimator assembly as described in claim 11, wherein:
said collimator tube comprises a cladding glass tube;
said core element comprises a glass core; and
said core element comprises a first glass transition temperature, said collimator tube comprises a second glass transition temperature, said first glass transition temperature and said second glass transition temperature are substantially identical.

15. A method of manufacturing a collimator assembly as described in claim 11, wherein said dissolving said core elements comprises:
placing said core elements into a water based acid bath.

* * * * *